No. 854,449. PATENTED MAY 21, 1907.
W. L. AUSTIN.
BRAKE MECHANISM FOR PIVOTED CAR TRUCKS.
APPLICATION FILED JAN. 7, 1907.
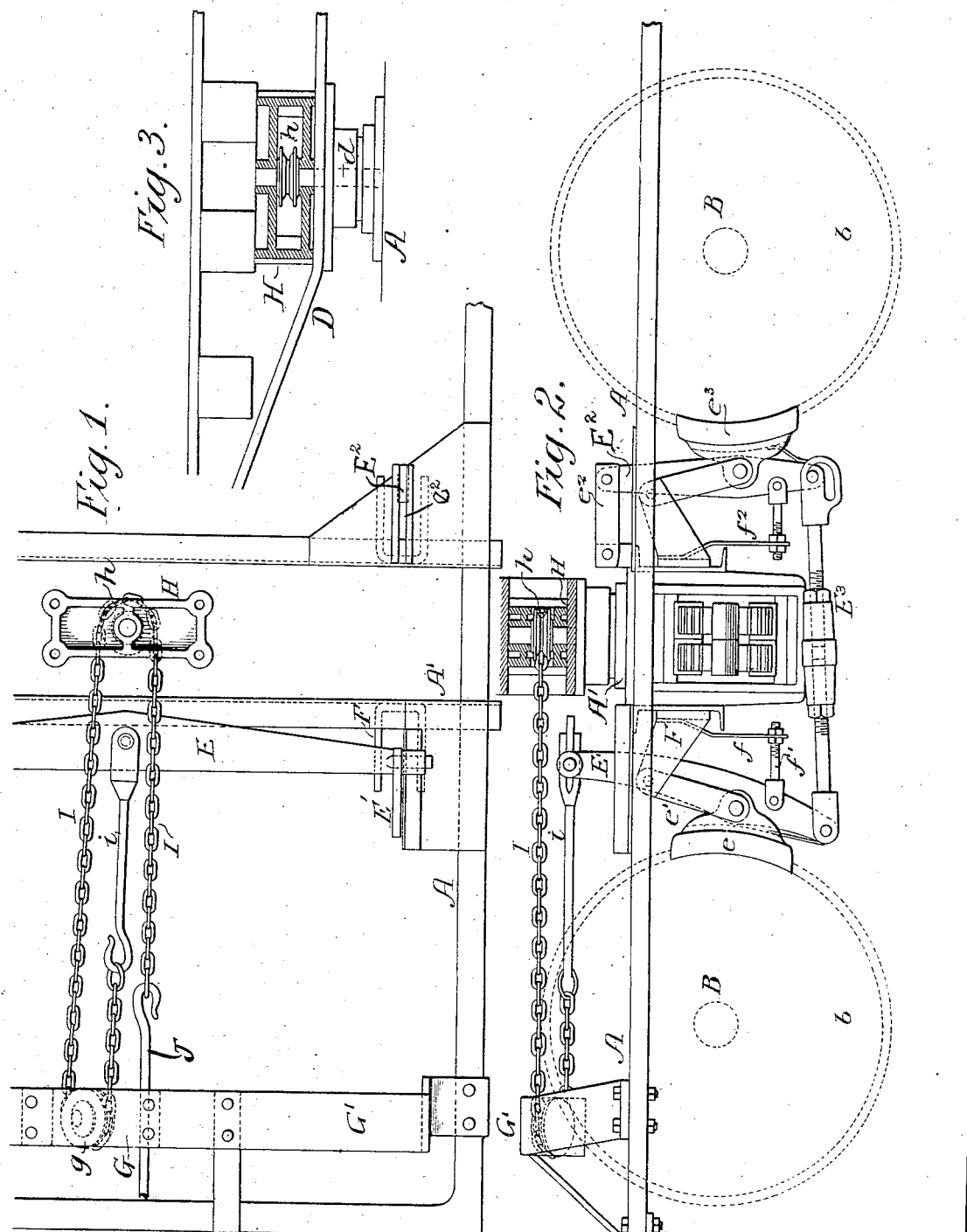
Witnesses:
Inventor
William L. Austin.
by his Attorneys,
Howson & Howson

UNITED STATES PATENT OFFICE.

WILLIAM L. AUSTIN, OF PHILADELPHIA, PENNSYLVANIA, ASSIGNOR TO BURNHAM, WILLIAMS & COMPANY, OF PHILADELPHIA, PENNSYLVANIA, A FIRM.

BRAKE MECHANISM FOR PIVOTED CAR-TRUCKS.

No. 854,449.

Specification of Letters Patent.

Patented May 21, 1907.

Application filed January 7, 1907. Serial No. 351,124.

*To all whom it may concern:*

Be it known that I, WILLIAM L. AUSTIN, a citizen of the United States, residing in Philadelphia, Pennsylvania, have invented certain Improvements in Brake Mechanism for Pivoted Car-Trucks, of which the following is a specification.

The object of my invention is to so construct the brake operating mechanism of a pivoted car truck that the car truck is free to swing without affecting the brake mechanism. This object I attain in the following manner, reference being had to the accompanying drawings, in which:

Figure 1, is a plan view of sufficient of a pivoted railway truck to illustrate my invention; Fig. 2, is a longitudinal sectional view of the truck; and Fig. 3, is a sectional view showing the car body transom.

In the drawings I have omitted the details of construction that do not relate particular to the brake mechanism in order to avoid confusion.

A is the frame of the truck.

B B are the axles and $b$ $b$ the wheels.

A' is the truck transom having the usual bolster and springs.

D is the car body transom, the truck being pivoted to the transom by a king bolt $d$.

E is a brake beam connected at each end to brake levers E' to which are pivoted the brake shoes $e$ $e$. These brake shoes are hung by links $e'$ to brackets F attached to the transom of the truck. A spring $f$ also attached to each bracket is connected by an adjustable bolt $f'$ to the lever E' tending to retract the brake shoe when released from the control of the brake operating mechanism.

When it is desired to brake on both wheels as illustrated in the drawings I pivot a lever E² to a bracket on the truck through a link $e^2$ and connect the two levers by an adjustable connecting rod E³; the brake shoe $e^3$ is pivoted to the lever E² and the spring $f^2$ is similar to the spring $f$ of the lever E'.

Pivoted to the beam E is a brake rod $i$ to which a chain I is attached. This chain passes around the sheave $g$ having its bearings in a bracket G secured to the cross beam G' attached to the frame A of the truck. The chain passes from this sheave around the sheave $h$ having its bearings in a frame H secured to the car body transom D and passes from this sheave $h$ to a brake rod J which is attached to the brake mechanism of the car.

The sheave $h$ is mounted in line with the king bolt or pivot of the truck so that the movement of the truck will not affect the sheave.

Thus it will be seen that the truck can swing on its pivot without in any manner affecting the brake mechanism as the brake chain extends first to the center of rotation of the truck and then around the sheave $g$ to the brake rod.

It will be understood that while I have illustrated one form of brake mechanism, other mechanism may be used without departing from the main feature of the invention.

In some instances the sheave $h$ may be mounted on the truck in line with the pivot but I prefer the construction shown.

I claim:—

1. The combination of a car, a truck pivoted to the car, brake mechanism on the truck, a sheave on the car body situated at the center of rotation of the truck, a brake chain attached to the brake mechanism on the truck and extending around the sheave and connected to the brake operating mechanism on the car, substantially as described.

2. The combination of a car, a truck pivoted thereto, brake mechanism on the truck consisting of levers and a brake beam, a sheave on the truck, a sheave at the center of rotation of the truck, a brake chain attached to the brake mechanism on the truck and passing around said sheaves and a brake rod connected to the chain, said brake rod extending to the brake operating mechanism of the car, substantially as described.

3. The combination of a car, a car body transom, a frame at the center of the car body transom, a sheave having its bearings in the frame, a truck pivoted to the car body transom, brake mechanism on the truck, a cross frame on the truck, a sheave on the cross frame, a chain passing from the brake mechanism around said sheave and around the sheave on the car body transom, with a brake rod attached to the chain and connected to the brake operating mechanism on the car, substantially as described.

In testimony whereof, I have signed my name to this specification, in the presence of two subscribing witnesses.

WM. L. AUSTIN.

Witnesses:
WM. P. HENSZEY,
FRED. WOOLLVEN.